United States Patent

Hattori

[19]

[11] Patent Number: 5,774,848
[45] Date of Patent: Jun. 30, 1998

[54] REFERENCE PATTERN TRAINING SYSTEM AND SPEECH RECOGNITION SYSTEM USING THE SAME

[75] Inventor: Hiroaki Hattori, Tokyo, Japan

[73] Assignee: NEC Corporationi, Tokyo, Japan

[21] Appl. No.: 613,887

[22] Filed: Mar. 11, 1996

[30] Foreign Application Priority Data

Mar. 9, 1995 [JP] Japan .................................. 7-050195

[51] Int. Cl.[6] ..................................................... G10L 5/06
[52] U.S. Cl. ......................... 704/244; 704/254; 704/255
[58] Field of Search .................................. 395/2.52, 2.63, 395/2.44, 2.64; 382/155, 229; 704/257, 245, 244, 252, 248, 258

[56] References Cited

U.S. PATENT DOCUMENTS

| 5,033,087 | 7/1991 | Bahl et al. | ............................... 395/2.65 |
| 5,526,466 | 6/1996 | Takizawa | ................................ 395/2.62 |

OTHER PUBLICATIONS

Lee, "Context–Dependent Phonetic Hidden Markov Models for Speaker–Independent Continuous Speech Recognition", *Readings in Speech Recognition*, ISBN 1–55860–124–4, pp. 347–365, (1990).
Furui, "Digital Speech Processing", *Tokai Shuppan*, ISBN4–486–00896–0, pp. 186–187, (1985).

Nakagawa, "Speech Recognition with Established Models", The Socity of Electronic Communications Engineers, pp. 28–51, (1988).

Huang, et al., "Semi–continuous Hidden Markov Models for Speech Signal", *Stochastic Approaches*, pp. 340–346, (1989).

Lee et al., "An Overview of the Sphinx Speech Recognition System", *Readings in Speech Recognition*, ISBN 1–55860–124–4, pp. 600–610. (1990).

*Primary Examiner*—David R. Hudspeth
*Assistant Examiner*—Donald L. Storm
*Attorney, Agent, or Firm*—Foley & Lardner

[57] ABSTRACT

A training unit selector takes out and compares phoneme data about recognition units stored in a recognition word dictionary and a training word dictionary, and selects a recognition unit from the recognition unit training words stored in the training word dictionary, the selected recognition unit resembling each selected recognition unit in a subject recognition word stored in the recognition word dictionary in phoneme context, the selected recognition unit being sent to a recognition unit reference pattern generator. The recognition unit reference pattern generator utilizes a recognition unit, which is best in accord in phoneme context among training data stored in a training data memory, concerning a recognition unit selected by the training unit selector.

10 Claims, 4 Drawing Sheets

REFERENCE PATTERN TRAINING SYSTEM AND SPEECH RECOGNITION SYSTEM USING THE SAME

BACKGROUND OF THE INVENTION

The present invention relates to a reference pattern training system for generating recognition units, which are smaller than words and with preceding and succeeding phoneme context taken into consideration, and also a speech recognition system using the same training system. More particularly, the present invention relates to a reference pattern training system, which can expand the scope of phoneme context while reducing the amount of stored data and providing high recognition performance, and a speech recognition system using the same training system.

FIG. 5 shows this type of prior art speech recognition system with a reference pattern training system. In this system, a word reference pattern generator 2 is connected to a reference pattern training unit 9. Speech is inputted to an analyzer 3, and a recognizer 4 outputs recognized words. The reference pattern training unit 9 has a recognition word dictionary 10, a training word dictionary 11, a training data memory 92, and a recognition unit reference pattern generator 93.

The word reference pattern generator 2 obtains data stored in the recognition word dictionary 10 in the reference pattern training unit 9 and generates and outputs a word reference pattern of a word under consideration (to be recognized) by successively coupling together reference patterns of recognition units outputted as a result of training from the recognition unit reference pattern generator 93 of the reference pattern training unit 9. The analyzer 3 analyzes the input speech and extracts and outputs a feature vector series therefrom. The recognizer 4 receives the word reference pattern outputted from the word reference pattern generator 2 and the feature vector pattern outputted from the analyzer 3 and recognizes the feature vector series on the basis of the received word reference pattern to output the recognized feature vector series as a word. The recognition unit reference pattern generator 93 generates and outputs a reference pattern of recognition units, which is dependent on phoneme context preceding and succeeding a phoneme, on the basis of preceding and succeeding phoneme context of recognition units in each training word described in the training word dictionary 11 and also recognition unit training data stored in the training data memory 92. Namely, the recognition unit reference pattern generator 93 generates a recognition unit having a predetermined phoneme context independent from the word to be recognized. The phoneme is one of recognition units, into which a word of speech is disassembled, and phoneme context represent statuses preceding and succeeding a phoneme.

Recognition methods using recognition units with preceding and succeeding phoneme context taken into consideration, have heretofore been proposed in order to attain high speech recognition efficiency. In one such method, in which a phoneme, for instance, is a recognition unit, a plurality of recognition units are provided for the phoneme such that they are based on preceding and succeeding phonemes. With this arrangement, coarticulation effects that are dependent on preceding and succeeding phonemes can be taken into the recognition units provided for a phoneme, and it is thus possible to obtain a higher speech recognition efficiency.

By way of example, K. F. Lee, "Context-Dependent Phonetic Hidden Markov Models for Speaker-Independent Continuous Speech Recognition", pp. 347–365, Readings in Speech Recognition, Morgan Kaufmann Publishers, ISBN 1-55860-124-4, proposes a phoneme model of a phoneme which takes a preceding and a succeeding phoneme into consideration. Such model permits better speech recognition performance to be obtained compared to models without consideration of preceding and succeeding phonemes.

The phoneme environment will now be described with reference to FIG. 4. FIG. 4 shows a word which consists of N different phonemes. It is prescribed that each phoneme is dealt with as a recognition unit. A case of generating recognition units for an i-th phoneme from the word forefront will be considered. In this case, (i-1) phonemes are on the left side of the i-th phoneme. Inclusive of the case of the sole i-th phoneme and not considering the left side phonemes, the left phoneme environment consideration length is i. Likewise, the right phoneme environment consideration length is (N-i+1).

Since the left and right phoneme environment consideration lengths are independent from each other, $i \times (N-i+1)$ recognition units are generated for the i-th phoneme. Thus, for the entire word it is necessary to generate recognition units in number calculated as follows. In the case where N is 10, it is necessary to generate $(10^3+3\times10^2+2\times10)/6$, i.e., 220, recognition units.

Formula 1

$$\Sigma_{i=1}^{N} i(N-1+1) = (N^3+3N^2+2N)/6$$

In the prior art reference pattern training apparatus and speech recognition system using the same apparatus as mentioned before, the phoneme environment consideration scope is preliminarily defined for generating recognition units, as shown in Literature 1. Therefore, it is impossible to reflect more phoneme context than those considered at the time of the design. In addition, for free vocabulary registration and modification, the phoneme context that are taken into considerations have to be broadened. This increases recognition units for each phoneme, thus requiring enormous storage capacity.

Where the scope of phoneme context take into considerations is small, training data containing the same word may be used together with other training data having the same phoneme context in the preliminarily considered scope. This results in spoiling of information obtained from the same word, and higher speech recognition performance can not be obtained than that by training on the basis of the same word alone. On the other hand, simply increasing the phoneme context leads to an increase of the number of recognition units involved. That is, recognition units which are unnecessary for expressing a word as a subject of recognition are generated as well, which is inefficient. Moreover, to permit free vocabulary registration, it is necessary to prepare recognition units having a variety of phoneme context. That is, it is necessary to have recognition units contained in training data for a variety of phoneme context. This requires storage of a large amount of data.

SUMMARY OF THE INVENTION

An object of the present invention is therefore to provide a reference pattern training system, capable of expanding the scope of phoneme context while reducing the amount of stored data and providing high recognition performance for the speech recognition system.

According to the present invention, there is provided a reference pattern training system for generating recognition units smaller than a word and with preceding and succeeding phoneme context taken into considerations, comprising:

a recognition word dictionary in which recognition subject words, recognition units contained in the recognition subject words and phoneme environment data about each of the recognition units are stored;

a training word dictionary in which recognition unit training words, recognition units contained in the recognition unit training words and phoneme environment data about each of the recognition units are stored; training data memory for storing recognition unit training data; a training unit selector for selecting a recognition unit from the recognition unit training words stored in the training word dictionary, the selected recognition unit resembling a selected recognition unit contained in a recognition subject word stored in the recognition word dictionary, by taking out and comparing phoneme environment data of individual recognition units from the recognition and training word dictionaries; and a recognition unit reference pattern generator dependent on phoneme context for training each recognition unit of the pertinent recognition subject word by using the training unit selected by the training unit selector and a recognition unit training data stored in the training data memory.

According to the present invention, there is provided a reference pattern training method comprising steps of: a first step of executing recognition analysis of a recognition subject word and extracting one recognition unit; a second step of selecting, from predetermined training words, at least one recognition unit, which resembles the extracted recognition unit in preceding and succeeding phoneme context; a third step of executing collation check of the selected recognition unit or units with reference to a selected reference pattern; a fourth step of, when it is found as a result of the collation that no checked recognition unit is in accord in the phoneme context with the received recognition unit, enumerating additional recognition units having the phoneme context that are in accord as a reference pattern to be generated, and storing a training word recognition unit that is in accord in the phoneme context as a training sample of the reference pattern; a fifth step of, when a recognition unit in accord with the reference pattern is already present, executing the check for the next recognition unit; and a sixth step of, when the next recognition unit to be checked is present, extracting the recognition unit and going back to the second step, the above steps being repeatedly executed until no remaining recognition unit is present.

Other objects and features will clarified from the following description with reference to attached drawings.

PREFERRED EMBODIMENTS OF THE INVENTION

Figure 1:
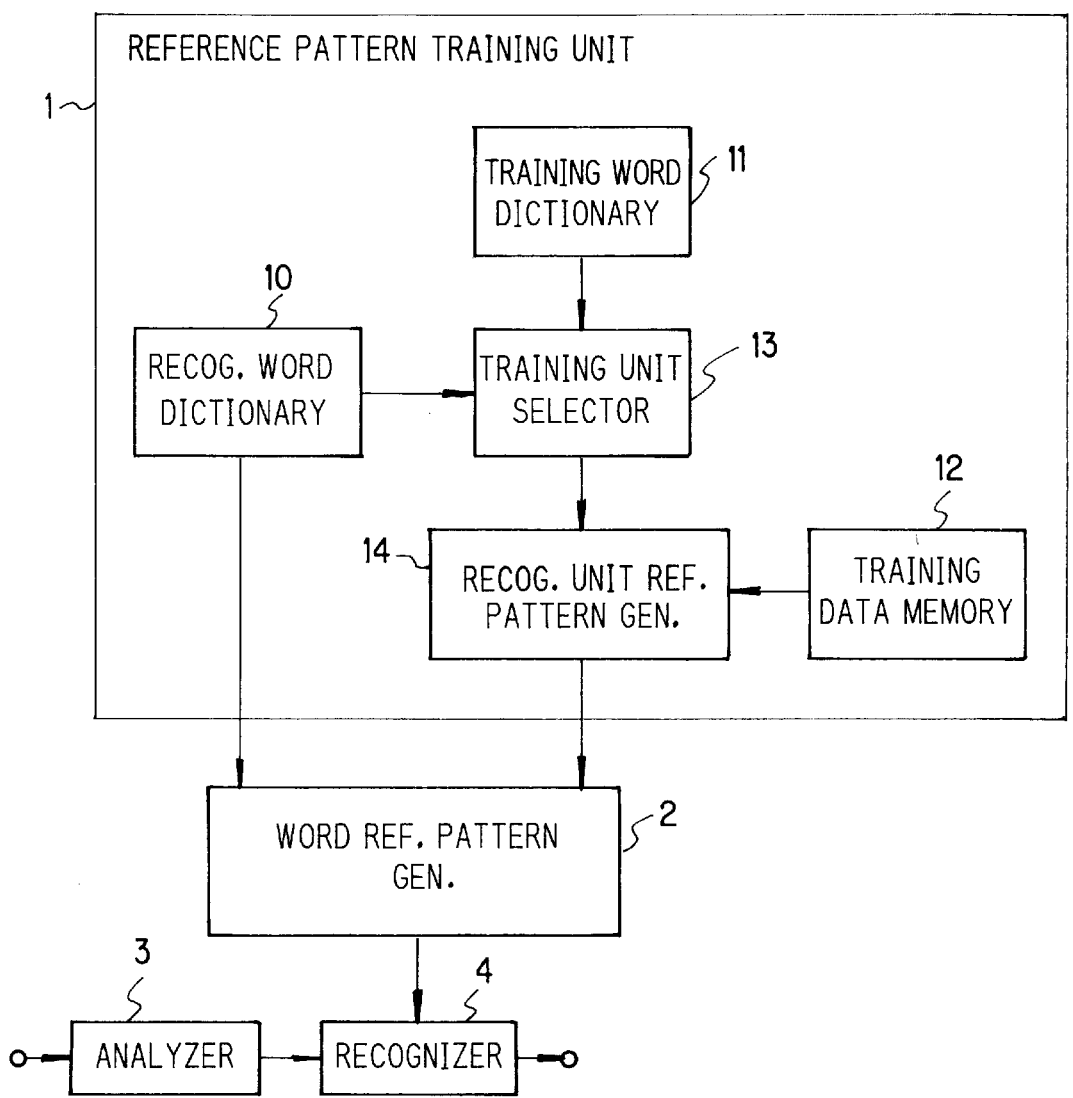
FIG. 1 shows a block diagram of a first embodiment of the present invention.

FIG. 1 shows, in a block diagram, one embodiment of the present invention. The speech recognition system shown in FIG. 1 is basically the same as the prior art speech recognition system described above, and comprises a reference pattern training unit 1, a word reference pattern generator 2, an analyzer 3 and a recognizer 4. The reference pattern training unit 1 includes a recognition word dictionary 10, a training word dictionary 11, a training data memory 12, a training unit selector 13, and a recognition unit reference pattern generator 14.

Figure 5:
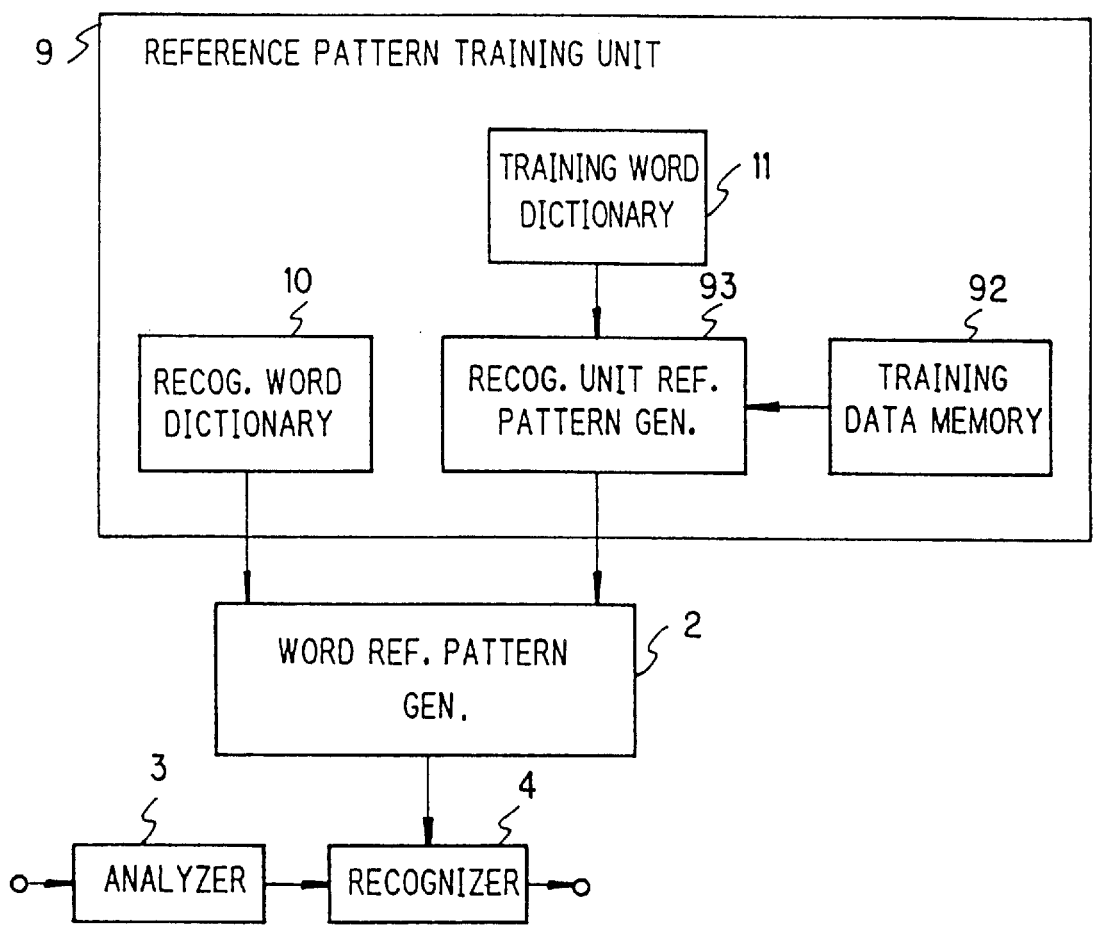
FIG. 5 shows a block diagram of the prior art speech recognition system.

The difference of the speech recognition system shown in FIG. 1 from the prior art system shown in FIG. 5, resides in that the training unit selector 13 is added, that the function of the training data memory 12 is supplemented, and that in correspondence to these changes the recognition unit reference pattern generator 14 is provided with additional functions.

Figure 2:
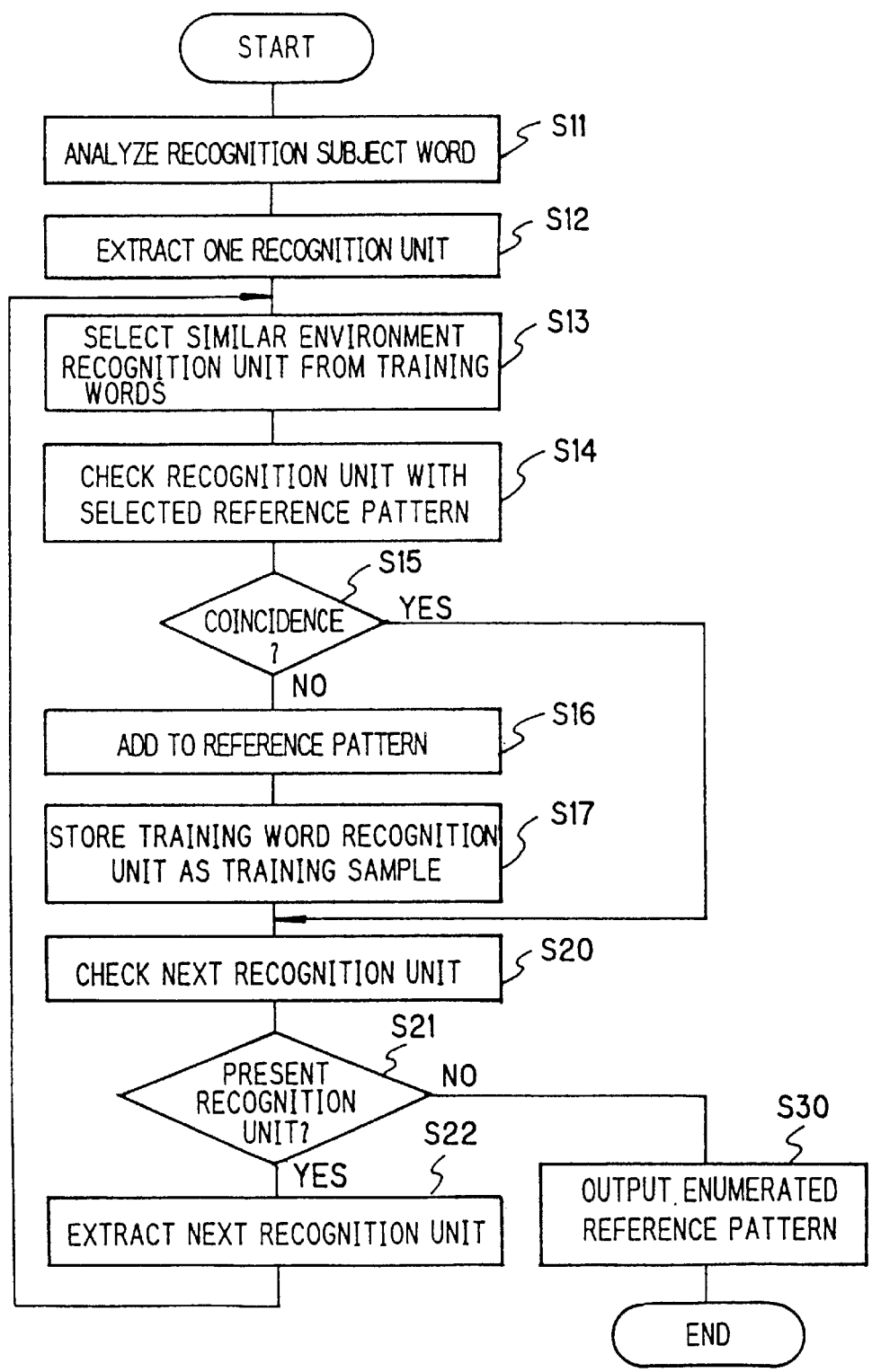
FIG. 2 shows the reference pattern training unit 1 in FIG. 1.

Recognition unit series in cases of no consideration of phoneme context of recognition subject words and preceding and succeeding phoneme context for each of these recognition units are prepared, and their data are stored in the recognition word dictionary 10 in the reference pattern training unit 1. In the training word dictionary 11 are stored data of recognition unit series in cases of no consideration of the phoneme context of the recognition unit training words and preceding and succeeding phoneme context of these recognition units. In the training data memory 12, feature parameters that are necessary for training parameters of reference patterns, are stored as training data for each recognition unit of each training word. The reference pattern training unit 1 generates recognition units by taking phoneme context of recognition units constituting recognition subject words and training words into consideration. This process will now be described step by step with reference to FIG. 2 as well as FIG. 1.

The training unit selector 13 executes recognition analysis of a recognition subject word received from the recognition unit dictionary 10 (step S11), and extracts one recognition unit (step S12). Then, the training unit selector 13 selects, from the training words stored in the training word dictionary 11, at least one recognition unit, which resembles the extracted recognition unit in preceding and succeeding phoneme context (step S13), and executes collation check of the selected recognition unit or units with reference to a reference pattern which has already been selected (step S14). When it is found as a result of the collation that no checked recognition unit is in accord in the phoneme environments with the received recognition unit ("NO" in step S15), the training unit selector 13 enumerates additional recognition units having the phoneme context that are in accord as a reference pattern to be generated (step S16), and it stores a training word recognition unit, at least one recognition unit of the training word selected in the step S13, that is in accord in the phoneme context as a training sample of the reference pattern (step 17).

After the step S17, or when "YES" is provided in the previous step S15, that is, when a recognition unit in accord with the reference pattern is already present, the training unit selector 13 executes the check for the next recognition unit (step S20). When the next recognition unit to be checked is present ("YES" in step S21), this recognition unit is extracted (step S22), and the routine goes back to the step S13. The routine is thus repeated until "NO" is provided in the step S21, that is, until no remaining recognition unit is present.

When the process with respect to all the recognition units is over, the training unit selector 13 outputs enumerated reference patterns to the recognition unit reference pattern generator 14 (step S30). The recognition unit reference pattern generator 14 executes training on each received recognition unit reference pattern by using the feature paremeter corresponding to the training sample by using the training data memory 12.

The word reference pattern generator 2 produces a word reference pattern by concatenating together recognition unit reference patterns produced by the recognition unit reference pattern generator 14. The recognizer 4 recognizes and outputs this word reference pattern as a word.

It is to be appreciated that recognition units are generated through selection, from among the recognition units in the training data, those which resemble the recognition units constituting the recognition subject word in a broader scope of phoneme context, and used for recognizing the word.

This means that it is not necessary to generate recognition units which are unnecessary for the expression of the recognition subject word. In addition, since no scope of phoneme context for consideration is determined in advance, when training data resembling the recognition subject word is present, it is possible to use recognition units with longer phoneme context taken into considerations, so that a higher recognition factor can be obtained. As the phoneme environment for consideration may be used one or more factors influential on acoustical features of the phonemes, such as phoneme, phoneme category, accent or non-accent, interval from the center of accent, pitch, speaking rate, etc.

The selection of the recognition unit having resembling phoneme context in the step S13, may be made from a broader scope by defining the similarity measure of individual phoneme context to one another. For example, where the similarity measure $d(e_i, e_j)$ of phoneme context $e_i$ and $e_j$ is prescribed for selecting a recognition unit with a greater phoneme environment similarity measure, it is possible to select only recognition units which are in accord in the usual phoneme context under a prescription that a sole condition "i=j" is effective.

In the above description, the feature parameters that are necessary for training parameters constituting the reference patterns in the training data memory 12 and also the method, in which the recognition unit reference pattern generator 14 studies recognition unit reference patterns by using the feature paremeter corresponding to training samples of individual reference patterns, are dependent on the art of recognition system, and various cases are conceivable.

For example, where use is made of a DP matching method using a multi-template (Furui, "Digital Speech Processing", pp. 186–187, Tokai Shuppan, hereinafter referred to as Literature 2), time series of acoustical feature parameters constituting individual recognition units are prepared and stored in the training data memory 12, and in the step S13 a reference pattern which is obtained by generating a pre-determined number of time series through clustering of the stored time series, is outputted.

Where use is made of a recognition technique using hidden Markov models (Nakagawa, "Speech Recognition with Established Models", the Society of Electronic Communication Engineers, hereinafter referred to as Literature 3) or of "Readings in Speech Recognition", Morgan Kaufmann Publishers, ISBN 1-55860-124 (hereinafter referred to as Literature 4), like the DP matching method, time series of acoustical feature parameters constituting individual recognition units are prepared and stored in the training data memory 12, and in the step S13 these time series are used for parameter re-prediction to output a reference pattern which is obtained as a result.

As for the feature parameters in the training process, for the training of the state transition probability $a_{ij}$, for instance, feature vector time series $\{O_{\upsilon\omega}\}$ of word $\omega$ spoken by speaker $\upsilon$ is observed, and probability $\gamma_{\upsilon\omega}(i_p, j_p, t)$ of occurrence of transition from status $i_p$ to status $j_p$ at instant t is stored and used as feature paremeter $\gamma_{\upsilon\omega}(i_p, j_p, t)$ necessary for the training. The present invention is also applicable to other recognition techniques than described above in cases where the subject of recognition is expressed by coupling together recognition units smaller than a word.

Where non-particular speakers are made the subject of recognition, training words spoken by a plurality of speakers are used for training to obtain reference patterns. In this case, as described above, a large storage capacity is necessary when time series of acoustical feature parameters constituting recognition units of the individual speakers are directly stored. Accordingly, it is possible to bundle time series for each training word. For example, it is possible to cluster the time series of the feature parameters of the individual speakers into groups less in number than the number of speakers involved by using the same method as the time series cluster formation in the recognition unit reference pattern generator 14 in step S13. By so doing, the storage capacity can be reduced to coasters corresponding to the number of speakers.

The training data memory 12 shown in FIG. 1 will now be described. Taking, for instance, the probability $\alpha_p$ of status transition from status $i_p$ to status $j_p$ of HMM (hidden Markov model) as a p-th recognition unit of a certain training word $\omega$, the cumulation $N\alpha_p$ (Formula (2) below) and accumulation times number $D\alpha_p$ of feature paremeter $\gamma_{\upsilon\omega}(i_p, j_p, t)$ necessary for the training as described above, are stored in the training data memory 12.

Formula 2

$$N\alpha_p = N\alpha_{i_p{}^\omega j_p} = \Sigma_\upsilon \Sigma_t \gamma_{\upsilon\omega}(i_p, j_p, t)$$

Formula 3

$$D\alpha_p = D\alpha_{i_p{}^\omega j_p} = \Sigma_\upsilon \Sigma_t \Sigma_j \gamma_{\upsilon\omega}(i_p, j_p, t)$$

As the feature paremeter constituting the feature vector time series may be used those shown in Literature 2 noted above, such as Cepstrum obtainable through FFT (Fast Fourier transform) analysis and LPC (linear prediction) analysis, and LPC coefficients, and time changes in these quantities. Since the feature paremeter $\gamma\upsilon\omega(i_p, i_p)$ necessary for the training of the state transition probability, thus is stored not as such but as its cumulation $N\alpha_p$ and accumulation times number $D\alpha_p$. The amount of stored data that is necessary thus may be reduced.

Where the number N of speakers, number S of average statuses of a training word model and average time length T of training words are prescribed, the necessary stored data amount is 2S/NT compared to the case of storing the feature paremeter $\gamma\upsilon\omega(i_p, j_p, t)$. Usually, "N>>1" and "T>S", and with N=100, T=100 and S=50, for instance, the necessary stored data amount is 1/100.

While the status transition probability is taken as an example, it is possible to train other parameters of HMM as well. Where the centroid or output probability distribution of feature vectors of discrete HMM, semi-continuous HMM, etc. is independent of recognition units, no feature paremeter need be stored for re-training these parameters, so that the amount of data that needs to be stored in the training data memory 12 may be reduced. In the case of continuous HMM, it is of course possible to reduce the feature paremeter data to be stored by arranging such that the output probability distribution need not be stored.

The training unit selector 13 shown in FIG. 1 will be described in detail. The training unit selector 13 selects at least one recognition unit stored in the training word dictionary 11, which recognition unit resembles a selected recognition unit among those stored the recognition word dictionary 10 in preceding and succeeding phoneme context, by using recognition unit series and preceding and succeeding phoneme context of the individual recognition units stored in the training word dictionary 11 and recognition unit series and preceding and succeeding phoneme context stored in the recognition word dictionary 10.

When no recognition unit resembling the selected recognition unit in the phoneme context is found among the existing reference patterns, a recognition unit having that phoneme context is added, and a training word recognition unit which is in accord in the phoneme context is stored as a training sample of the reference pattern. It is assumed here that a recognition unit with phoneme context in accord with those of recognition unit p is present in $N_q$ training words and that the word $\omega_q$ (i) ($1 \leq i \leq N_q$) containing this recognition unit and the position Pq(i) of the recognition unit are defined.

The recognition unit reference pattern generator 14 in FIG. 1 will now be described in detail. The recognition unit reference pattern generator 14 reads out the feature paremeter, stored in the training data memory 12, of the training sample of each recognition unit reference pattern selected by the training unit selector 13, and studies the recognition unit reference patterns present in the read-out phoneme context.

As an example, the probability $\alpha_q$ of status transition of recognition unit q having certain phoneme context from status $i_q$ to status $j_q$, is trained after the following Formula (4).

Formula 4:
$$\alpha_q = \alpha_{iqjq} = \frac{\sum_{i=1}^{Nq} N\alpha_{P_q(i)P_q(i)}^{\omega_q(i)}}{\sum_{i=1}^{Nq} D\alpha_{P_q(i)P_q(i)}^{\omega_q(i)}}$$

The word reference pattern generator 2, analyzer 3 and recognizer 4, which constitute a speech recognition system together with the reference pattern training unit 1, will now be described.

The word reference pattern generator 2 reads out recognition unit series and preceding and succeeding phoneme context of individual recognition units from the recognition word dictionary 10, and generates a word reference pattern by coupling together recognition unit reference patterns dependent on phoneme context, which are generated by the recognition unit reference pattern generator 14. The analyzer 3 analyzes input speech for conversion to a feature vector time series. As the feature vector may be utilized FFT analysis, cepstrum obtainable by LPC analysis, LPC calculation and time changes in these parameters, as described in Literature 2 noted above. The recognizer 4 recognizes the feature vector time series received from the analyzer 3 by using the word reference pattern generated in the word reference pattern generator 2, and outputs the result of recognition.

A second embodiment of the present invention will now be described with reference to FIG. 3.

Figure 3:
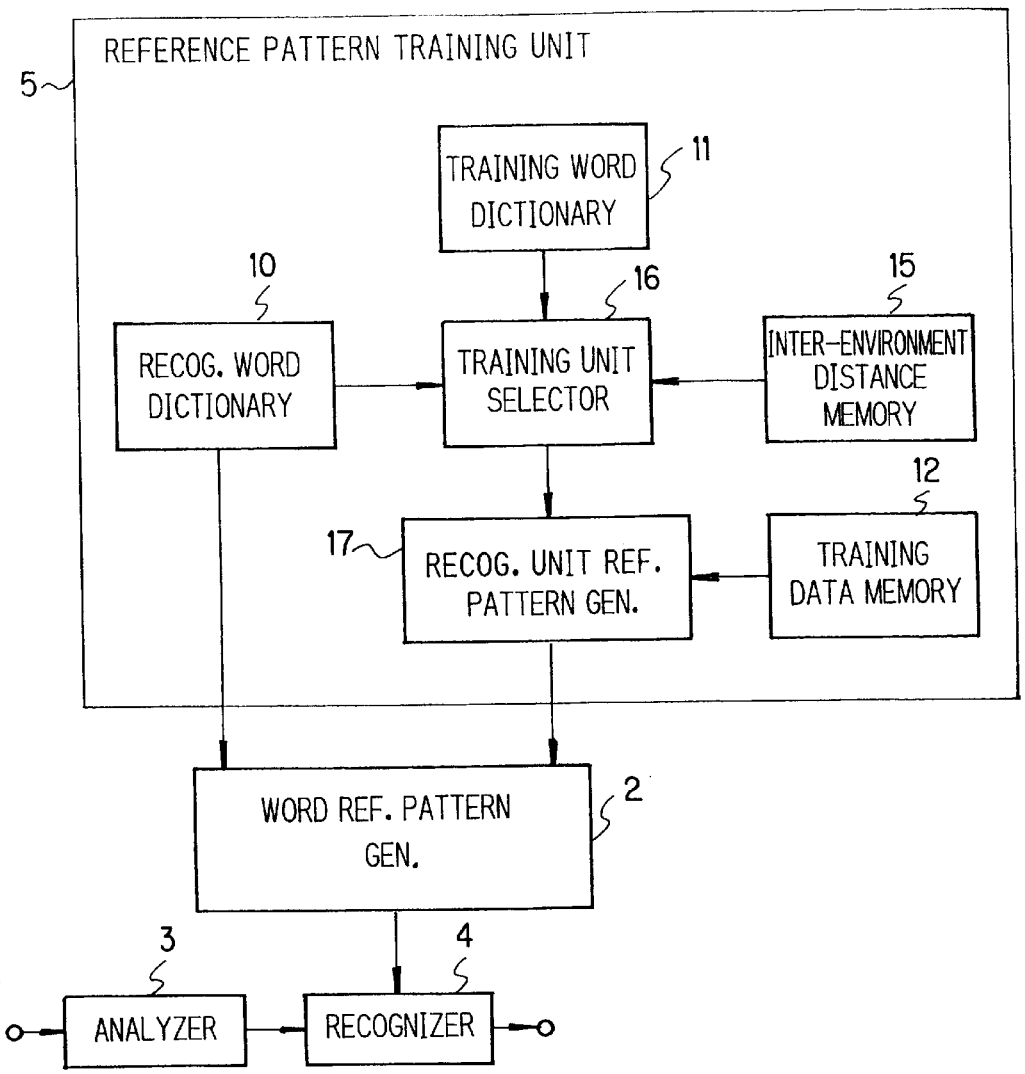
FIG. 3 shows a block diagram of a second embodiment of the present invention.
Figure 4:
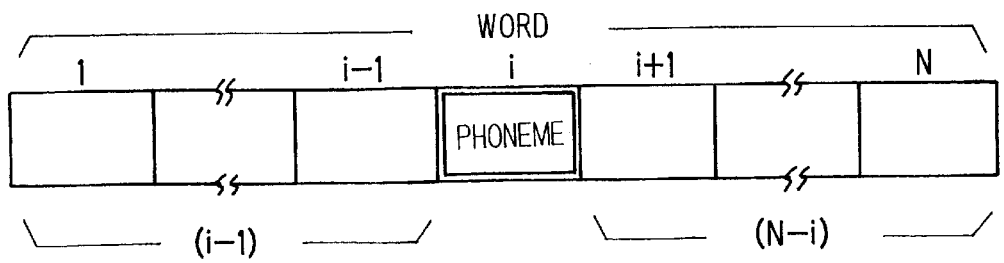
FIG. 4 shows a word which consists of N different phonemes for explaining the phoneme environment.

Parts shown in blocks in FIG. 3 like those in FIG. 1 are designated by like reference numerals are Not described. In this case, an inter-environment distance memory 15, a training unit selector 16 and a recognition unit reference pattern 15 are described.

In the inter-environment distance memory 15 the resemblance degree $D(e_i, e_j)$ of predetermined phoneme context $e_i$ and $e_j$ is stored. The training unit selector 16 selects at least one recognition unit stored in the training word dictionary 11, which recognition unit resembles a selected recognition unit among those in the recognition word dictionary 10 in preceding and succeeding phoneme context, by using recognition unit series and preceding and succeeding phoneme context of the individual recognition units in the training word dictionary 11, recognition unit series and preceding and succeeding phoneme context stored in the recognition word dictionary 10, and inter-environment distance $d(e_i, e_j)$ stored in the inter-environment distance memory 15. Specifically, under conditions of the phoneme environment $e_g(k)$ ($1 \leq k \leq K$) of a recognition unit in recognition word and the phoneme environment $e_h(k)$ ($1 \leq k \leq K$) of the same length of a recognition unit in the training word, the distance between these recognition units is obtained from Formula (5) below, and a training word recognition unit with a smaller inter-recognition unit distance is selected as one with resembling environments.

Formula 5

$$D = \Sum_{k=1}^{K} d\,[e_g(k), e_h(k)]$$

When no recognition unit resembling the selected recognition unit in the phoneme context is found among the existing reference patterns, a recognition unit having that phoneme context is added, and a training word recognition unit which is in accord in the phoneme context is stored as a training sample of the reference pattern.

The recognition unit reference pattern generator 17 does weighting using a monotonously reducing function (D) concerning the inter-recognition unit distance D [q, $\omega_q(i)$, $p_q(i)$] between a recognition unit q obtained by the training unit selector 13 and a $p_q(i)$-th recognition unit of the training word $\omega_q(i)$ which is in accord with the recognition unit q in the phoneme context, and it does training after Formula (6) below. This permits taking more training data having more resembling phoneme context.

Formula 6:
$$\alpha_q = \alpha_{iqjq} = \frac{\sum_{i=1}^{Nq} \omega[D(q,\omega_q(i),P_q(i))]N\alpha_{P_q(i)P_q(i)}^{\omega_q(i)}}{\sum_{i=1}^{Nq} \omega[D(q,\omega_q(i),P_q(i))]D\alpha_{P_q(i)P_q(i)}^{\omega_q(i)}}$$

While the above description dealt with the individual functions shown as respective blocks, it is possible to separate or combine these functions. In addition, it is possible to execute steps concurrently; for instance, the next recognition unit may be extracted concurrently with the reference pattern generation. In general, it is possible to concurrently execute steps or shift steps so long as the functions described above are not spoiled. It is thus to be construed that the above description is by no means limitative.

As has been described in the foregoing, according to the present invention the training unit selector compares phoneme environment data of recognition units stored in the recognition word dictionary and training word dictionary, and it selectively send out recognition units, which have environments similar to those of recognition units contained in a recognition subject word stored in the recognition word dictionary, as training units to the recognition unit reference pattern generator. Thus, extra recognition units which are not contained in the recognition subject word are not generated, so that it is possible to obtain a speech recognition system, which can reduce the storage amount and process amount of data for generating the word reference pattern.

In addition, regarding the recognition units which are present in the recognition subject word and selected by the training unit selector, the recognition unit reference pattern generator can utilize recognition units which are in best accord in phoneme environment with those present in the training word, and it is thus possible to obtain high recognition performance. For example, the same training word, if any, as the recognition subject word, may be used to training and use recognition units, so that it is possible to high recognition accuracy.

Moreover, since the training data memory stores, instead of training data itself, only information necessary for the recognition unit training, it is possible to provide a speech recognition system, which requires less process amount and storage amount of data for such processing as registration and altering of vocabularies.

In summary, the present invention determines, when a word to be recognized is added or changed, a recognition unit necessary for expressing the subject word and generates and stores only the determined recognition unit model, thereby reducing the storage capacity and the calculation amounts required for the reference pattern training and improving the recognition performance.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. A reference pattern training system for generating recognition units smaller than a word and with preceding and succeeding phoneme context taken into consideration, comprising:

a recognition word dictionary in which recognition subject words, recognition units contained in the recognition subject words and phoneme environment data about each of the recognition units are stored;

a training word dictionary in which recognition unit training words, recognition units contained in the recognition unit training words and phoneme environment data about each of the recognition units are stored;

training data memory for storing recognition unit training data;

a training unit selector for selecting a recognition unit from the recognition unit training words stored in the training word dictionary, the selected recognition unit resembling a recognition unit contained in a recognition subject word stored in the recognition word dictionary, by taking out and comparing phoneme environment data of individual recognition units from the recognition and training word dictionaries; and a recognition unit reference pattern generator dependent on phoneme context for training the selected recognition unit by using the training unit selected by the training unit selector and recognition unit training data stored in the training data memory.

2. The reference pattern training system according to claim 1, wherein the phoneme context include at least one of phoneme, phoneme category, accent or non-accent, distance from the center of accent, pitch and speaking rate.

3. The reference pattern training system according to claim 1, wherein the training unit selector selects as the training unit a recognition unit which found as a result of the comparison that it has a preceding and a succeeding phoneme environment in accord with each other in the maximum length range.

4. The reference pattern training system according to claim 1, which further comprises an inter-environment distance memory for storing inter-environment distance between phonemes, the selection of the recognition unit as the training unit by the inter-environment distance memory being done in a range prescribed with the data stored in the inter-environment distance memory taken into consideration.

5. The reference pattern training system according to one of claims 1 to 4, wherein environment range prescriptions prescribing scopes of phoneme context are provided to let the training unit selector select a recognition unit having predetermined long preceding and succeeding phoneme environment ranges as a training unit so long as a recognition unit meeting the environment range prescriptions are present in the recognition unit training word.

6. The reference pattern training system according to claim 5, wherein the predetermined long preceding and succeeding phoneme environment ranges are at least the lengths of the preceding and succeeding phoneme context of the selected recognition unit or the number of recognition units present in the recognition unit training word.

7. The reference pattern training system according to one of claims 1 to 4, wherein feature parameters necessary for the reference pattern generation are stored in the training data memory for each recognition unit of each recognition unit training word.

8. The reference pattern training system according to claim 7, wherein cumulation and accumulation times number of the feature parameters necessary for the reference pattern generation are stored in the training data memory.

9. A speech recognition system comprising:

a reference pattern training system according to one of claims 1 to 4;

a word reference pattern generator for obtaining data stored in the recognition unit dictionary in the reference pattern training system and successively coupling together recognition unit reference patterns outputted as a result of training from the recognition unit reference pattern generator in the reference pattern training system to generate and output a word reference pattern as a subject word;

an analyzer for analyzing an input speech to extract and output a feature vector series; and a recognizer for receiving the word reference pattern and the feature vector series and recognizing the feature vector series by using the word reference pattern to output the recognized feature vector series as a word.

10. A reference pattern training method comprising the steps of:

a first step of executing recognition analysis of a recognition subject word and extracting one recognition unit;

a second step of selecting, from predetermined training words, at least one recognition unit, which resembles the extracted recognition unit in preceding and succeeding phoneme context;

a third step of executing collation check of the selected recognition unit or units with reference to a selected reference pattern;

a fourth step of, when it is found as a result of the collation that no checked recognition unit is in accord in a phoneme context with the selected recognition unit, adding the selected recognition unit as a reference pattern to be generated, and storing recognition units in the training words that are in accord in the phoneme context as training samples of the selected reference pattern;

a fifth step of, when a recognition unit in accord with the reference pattern is already present, executing the check for the next recognition unit; and a sixth step of, when the next recognition unit to be checked is present, extracting the recognition unit and going back to the second step, the above steps being repeatedly executed until no remaining recognition unit is present.

* * * * *